United States Patent
Ting et al.

(10) Patent No.: US 11,231,767 B2
(45) Date of Patent: Jan. 25, 2022

(54) DYNAMIC FREQUENCY SCALING

(71) Applicant: Taiwan Semiconductor Manufacturing Co., Ltd., Hsin-Chu (TW)

(72) Inventors: Kai-Yuan Ting, San Jose, CA (US); Ashok Mehta, Los Gatos, CA (US); Stanley John, Fremont, CA (US); Sandeep Kumar Goel, Dublin, CA (US)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 665 days.

(21) Appl. No.: 16/111,881

(22) Filed: Aug. 24, 2018

(65) Prior Publication Data

US 2018/0364783 A1 Dec. 20, 2018

Related U.S. Application Data

(62) Division of application No. 13/414,201, filed on Mar. 7, 2012, now Pat. No. 10,061,374.

(51) Int. Cl.
*G06F 1/324* (2019.01)

(52) U.S. Cl.
CPC ............. *G06F 1/324* (2013.01); *Y02D 10/00* (2018.01)

(58) Field of Classification Search
CPC .................. G06F 1/324; Y02D 10/00
See application file for complete search history.

(56) References Cited

U.S. PATENT DOCUMENTS

| | | | |
|---|---|---|---|
| 2003/0028864 A1* | 2/2003 | Bowen | G06F 8/48 717/141 |
| 2009/0171646 A1* | 7/2009 | Silbermintz | G06F 11/3616 703/16 |
| 2011/0239007 A1* | 9/2011 | Kaiser | G06F 1/324 713/300 |

OTHER PUBLICATIONS

Littlestone, N. et al., "The Weighted Majority Algorithm", UCSC-CRL-91-28, Revised Oct. 26, 1992, pp. 1-38.
Freund, Y., et al., "A Decision-Theoretic Generalization of On-Line Learning and an Application to Boosting", Journal of Computer and System Sciences 55, 1997, Article No. SS971504, pp. 119-139.
Lee, et al., "SoC Design Environment with Automated Configurable Bus Generation for Rapid Prototyping", 2005, 4 pages.
Kwon, et al., "Performance-Drive Event-Based Synchronization for Multi-FPGA Simulation Accelerator With Event Time-Multiplexing Bus", Sep. 2005, IEEE Transactions on Computer-Aided Design of Integrated Circuits and Systems, 23(9):14444-1456.
Cho, et al., "System-Level Power Estimation using an On-Chip Bus Performance Monitoring Unit", IEEE, 2008, pp. 149-150.
Hsu, et al., "Compiler-Directed Dynamic Frequency and Voltage Scheduling", LNCS, 2008, pp. 65-81.
Cai, et al., "Transaction Level Modeling: An Overview", ACM, 2003, pp. 19-24.

* cited by examiner

*Primary Examiner* — Saif A Alhija
(74) *Attorney, Agent, or Firm* — Duane Morris LLP

(57) ABSTRACT

A method for dynamic frequency scaling (DFS) on the electronic systems level (ESL). The method can run in a virtual environment and dynamically scale the frequency of a virtual component based on a first transaction time and a second transaction time.

20 Claims, 7 Drawing Sheets

DYNAMIC FREQUENCY SCALING

CROSS-REFERENCE TO RELATED APPLICATION

This application is a division of U.S. patent application Ser. No. 13/414,201, which was filed on Mar. 7, 2012, entitled "DYNAMIC FREQUENCY SCALING," which is incorporated herein in its entirety.

FIELD

This disclosure relates generally to microprocessors, and more particularly to dynamic frequency scaling in microprocessors.

BACKGROUND

In today's market, there is a demand for high performance computing devices which use less power. One example is a mobile device that operates off battery power for listening to music, browsing the internet, or watching movies. Newer high performance hardware solutions, however, may consume more power than their predecessors. This is particularly true for emerging systems on a chip ("SoC") and three dimensional integrated circuit ("3DIC") designs. It is therefore helpful to balance performance desires with power restraints when designing new computing devices.

Hardware components, such as CPUs, may dynamically alter their frequency to balance performance and power consumption. Running at a lower frequency may reduce power consumption at a cost to performance, while running at a higher frequency may increase performance but consume more power. This dynamic adjustment is commonly known as Dynamic Frequency Scaling ("DFS") or Dynamic Voltage and Frequency Scaling ("DVFS").

DETAILED DESCRIPTION

Figure 1:
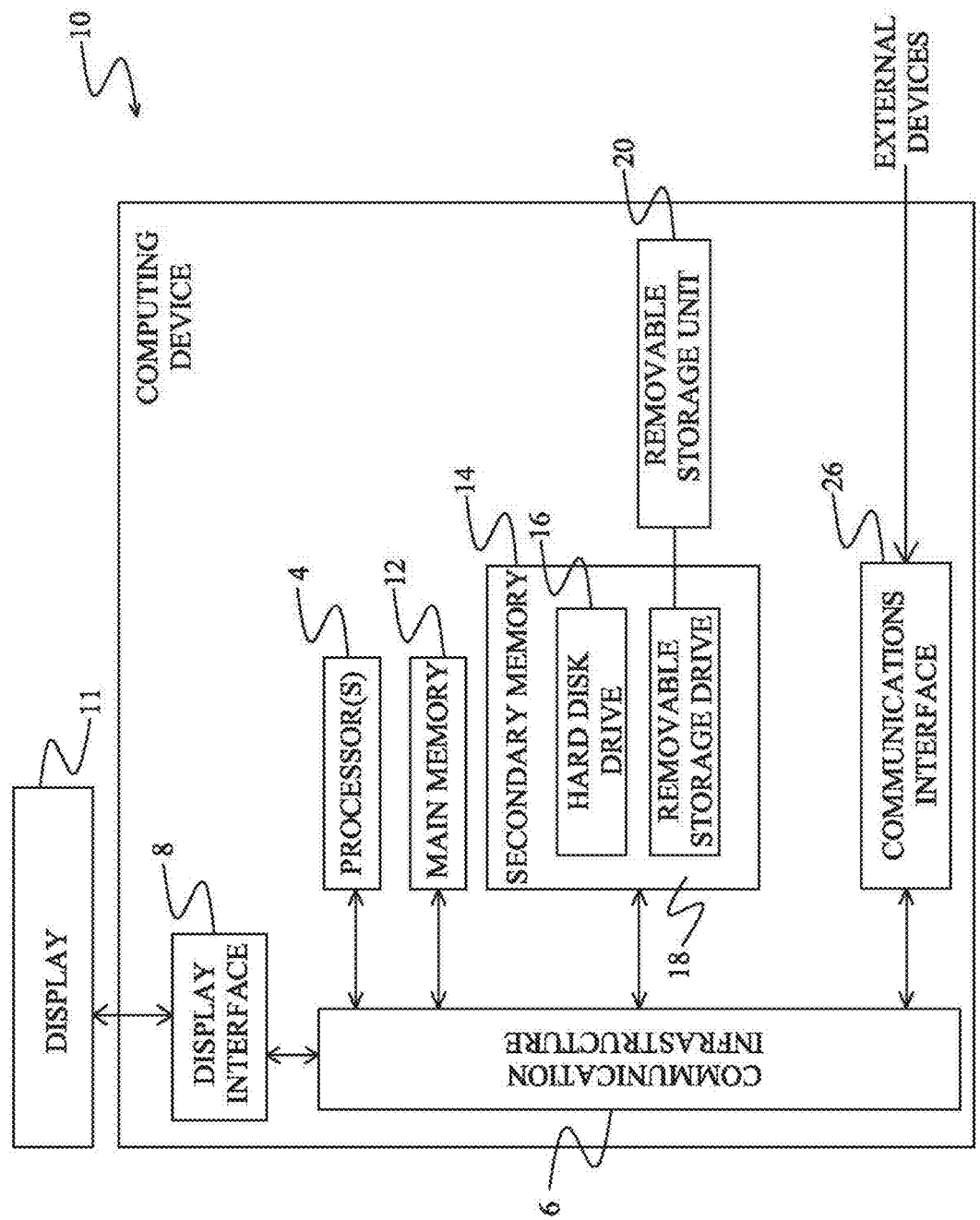
FIG. 1 is a block diagram of one example of a general purpose computing device programmed with software to form a special purpose tool to host an electronic systems level virtual environment.

This description of the exemplary embodiments is intended to be read in connection with the accompanying drawings, which are to be considered part of the entire written description. Embodiments are described including dynamic frequency scaling in high frequency hardware components, and specifically to performing a frequency scaling analysis in a virtual environment.

Engineers may also find it desirable to design computer systems capable of dynamically altering the frequency of their hardware components, such as microprocessors or other devices having embedded processors. The frequency scaling is also referred to as Dynamic Frequency Scaling ("DFS") or Dynamic Voltage and Frequency Scaling ("DVFS"). Reducing the frequency of components while they are lightly loaded or not in use may result in power savings. It could be desirable to adjust this frequency based on system trends as a whole, rather than on the behavior of a single application. Such an adjustment allows the system to dynamically learn new power profiles, anticipate future performance demands, and adjust the frequency or frequency-voltage combination accordingly.

For example, in a system running multiple applications, some tasks may be I/O intensive while others are CPU intensive. If most or all of tasks are I/O bound, the CPU may be run at a low frequency to conserve power without substantially impacting total system performance. Conversely, if most or all of the tasks are CPU bound, the CPU may run at a higher frequency to increase performance. If the tasks are mixed, such that some tasks are CPU intensive while others are I/O intensive, the CPU may be run at some frequency between the high and the low frequencies to balance both power consumption and performance.

In some embodiments, Dynamic Frequency Scaling involves a-priori knowledge about how a specific application runs. For example, an application may primarily perform I/O operations, and may therefore instruct a CPU to lower its frequency. If a second application is started that is CPU intensive, however, the new application must request the CPU adjust accordingly. The system therefore adjusts itself in real time rather than making predictions about future performance. This results in adjustments that can be optimized for specific applications, rather than optimized for the system as a whole.

While power analysis, such as DFS analysis, is commonly performed at the register transfer level ("RTL"), it may be beneficial to perform it at the Electronic Systems Level ("ESL") instead. The RTL may perform slowly, and analysis at that level may therefore require complex calculations, estimations, and other shortcuts. Additionally, if a power issue is discovered at the RTL level it may be difficult, time consuming, and expensive to modify the design.

The ESL provides a virtual environment for system design. The virtual platform can simplify power analysis and may increase the speed at which design alternations are made. For example, in some embodiments, the ESL allows the designed system to operate at millions of cycles per second. The higher cycles may allow engineers to observe system power consumption and performance impact, without needing to perform complicated calculations and estimates. This may reduce the number of human errors and uncertainties. The speed may also allow multiple simulation iterations to verify successes or deficiencies in the design. If a design alteration is to be performed, it can be made programmatically. Additionally or alternatively, design at the ESL level allows substantial amounts of data to be gathered and stored for future analysis or comparison.

FIG. 1 illustrates one example of general computer system 10 capable of processing software, in this case programmed with software to form a special purpose tool hosting an ESL virtual environment. As shown in FIG. 1, in some embodiments, computing device 10 includes one or more processors, such as processor(s) 4. Processor(s) 4 may be any central processing unit ("CPU"), microprocessor, micro-controller, or computational device or circuit for executing instructions and be connected to a communication infrastructure 6 (e.g., a communications bus, cross-over bar, or network). Various software-controlled embodiments are described in terms of this computing device 10.

In some embodiments, computing device 10 includes a display interface 8 that forwards graphics, text, and other data from the communication infrastructure 6 (or from a frame buffer not shown) for display on a monitor or display unit 11.

Computer system also includes a main memory 12, such as a random access (RAM) memory, and optionally, a secondary memory 14. In some embodiments, secondary memory 14 includes a more persistent memory such as, for example, a hard disk drive 16 and/or removable storage drive 18, representing a flash drive, optical disk drive or the like. Removable storage drive 18 reads from and/or writes to a removable storage unit 20. Removable storage unit 20 represents a flash drive, optical disk or the like, which can be read by and written to by removable storage drive 18.

In some embodiments, computing device 10 also includes one or more communication interfaces 26, which allows software and data to be transferred between computing device 10 and external devices such as, for example, a mainframe or server. Examples of the one or more communication interfaces 26 include, but are not limited to, a modem, a network interface (such as an Ethernet card or wireless card), a communications port, a Personal Computer Memory Card International Association ("PCMCIA") slot and card, one or more Personal Component Interconnect ("PCI") Express slot and cards, or any combination thereof. Software and data transferred via communications interface 26 are in the form of signals, which can be electronic, electromagnetic, optical, or other signals capable of being received by communications interface 26. These signals are provided to communications interface 26 via a communications path or channel. The channel can be implemented using wire or cable, fiber optics, a telephone line, a cellular link, a radio frequency ("RF") link, or other communication channels.

Figure 2:
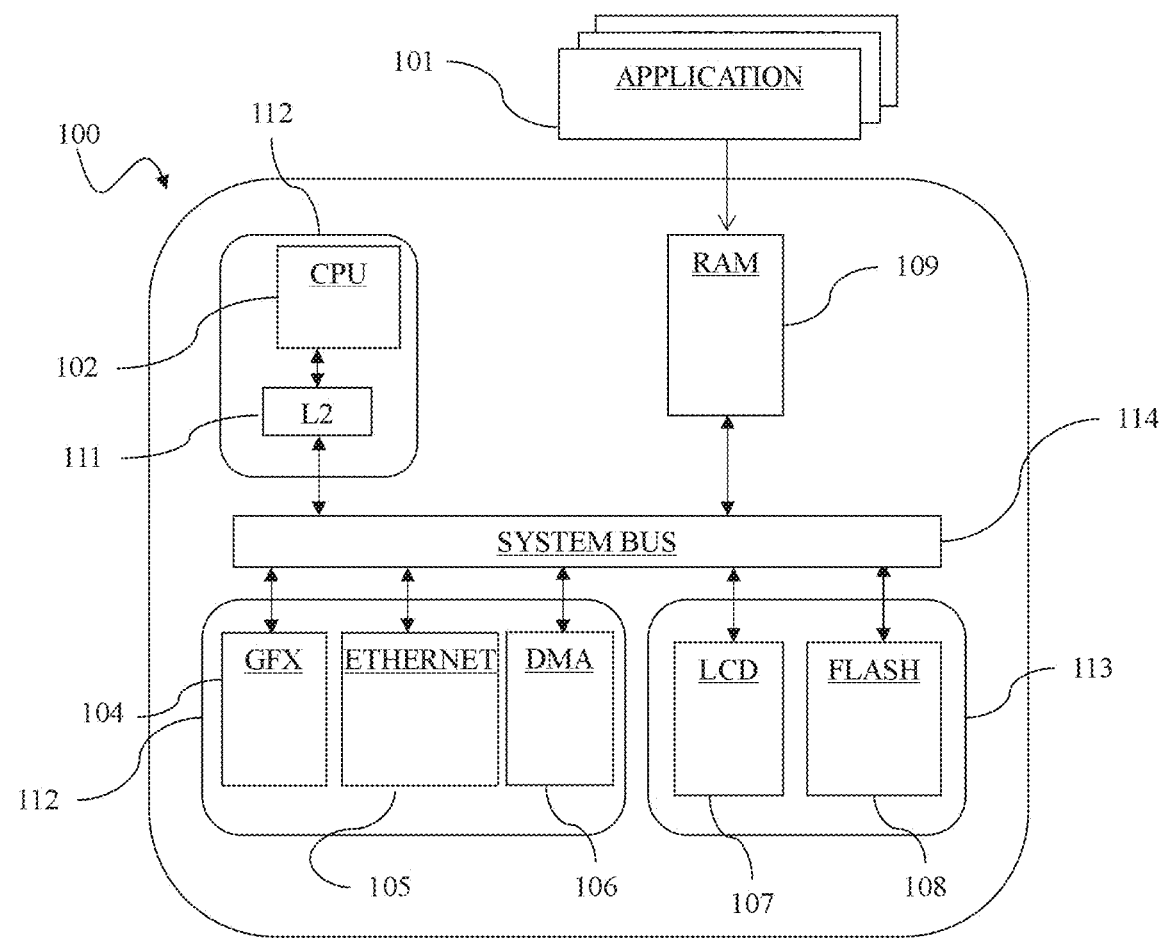
FIG. 2 is a diagram of a hardware platform which may be simulated at the electronic systems level as a virtual environment.

FIG. 2 is a diagram of a physical platform that can be simulated at the ESL. The physical platform 100 may be a SoC or a 3D IC. The platform comprises a plurality of application tasks 101 to be processed by the system. Additionally, platform 100 comprises a processor 102, and a plurality of other hardware components. In some embodiments, the hardware components include graphics 104 ("GFX"), Ethernet 105, Direct Memory Access 106 ("DMA"), Liquid Crystal Display 107 ("LCD"), Flash Memory 108, Random Access Memory ("RAM") 109, and L2 Cache 111. The hardware components may be further divided into high frequency components 112 and low frequency components 113. In some embodiments, Processor 102 and the other hardware components are in communication with each other over system bus 114.

The physical platform 100 can be simulated at the electronic systems level (ESL). Such a simulation can be run on any general purpose computing system programmed with software to form a special purpose processor, such as the system depicted in FIG. 1. For example, in some embodiments, processor 101, depicted in FIG. 2, is embodied as an Instruction Set Simulator ("ISS"). Each of the other hardware components can similarly be embodied in virtual components. These virtual components could be comprised of the processor 10 configured with computer software to emulate the functionality of physical hardware components 104-108. Additionally, application tasks 101 can be run on the ESL simulation independent from the underlying computing system. That is, application tasks 101 can be fully contained and unaware that they are being run on a virtual, rather than a physical, machine.

In some embodiments, application tasks 101 are simulated application tasks. In such an embodiment, aspects of the tasks, such as transaction destination or processing time, can be predefined. A user may input these aspects, or they can be generated by a computer. For example, a user wishing to simulate a video game can set the simulated application tasks to be CPU and GFX intensive. Similarly, a user may emulate I/O transactions by directing one or more tasks to simulate storing data in flash memory. Such an embodiment allows power and frequency analysis without the need to run actual applications. For example, each simulated task or transaction can be generated, injected into the system and assigned a transaction time according to predetermined probability distributions. The task can also preempt the processor and/or system bus or other resource during its transaction time. Thus, the queuing delay experienced by the task, and the resource usage can be monitored without performing all of the steps of each task at signal level.

Figure 3:
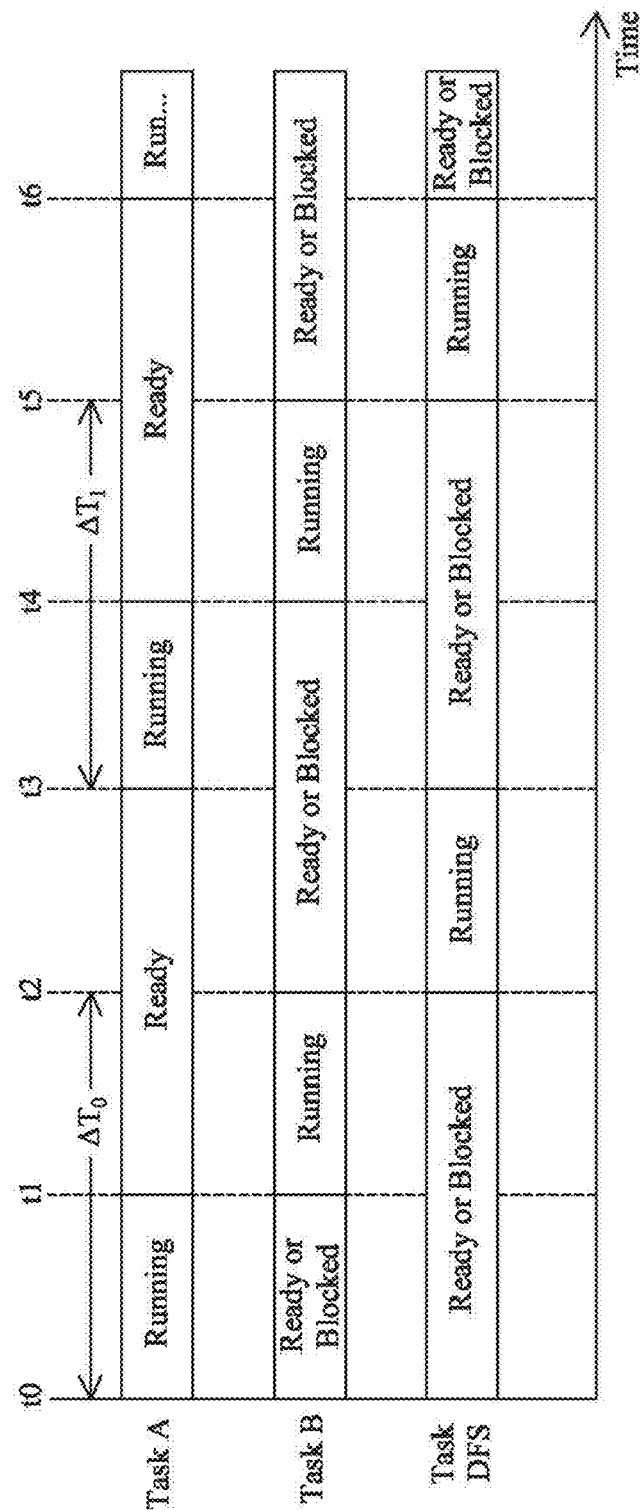
FIG. 3 is a state diagram depicting a plurality of computer tasks operating on a virtual environment.

FIG. 3 is a state diagram depicting a plurality of computer tasks operating on a virtual environment, such as an ESL simulation of the physical platform depicted in FIG. 2. While there are only three tasks shown in the example of FIG. 3, other embodiments have any number of tasks. Task DFS is an application task configured to perform the method depicted in FIG. 3. Task A and Task B can be any other application task, real or simulated. Time is represented along the x-axis which is segmented into time slices t0-t6. Although the state diagram of FIG. 3 does not continue past t6, the tasks can run until terminated, and there may therefore be an unlimited number of time slices.

Figure 4:
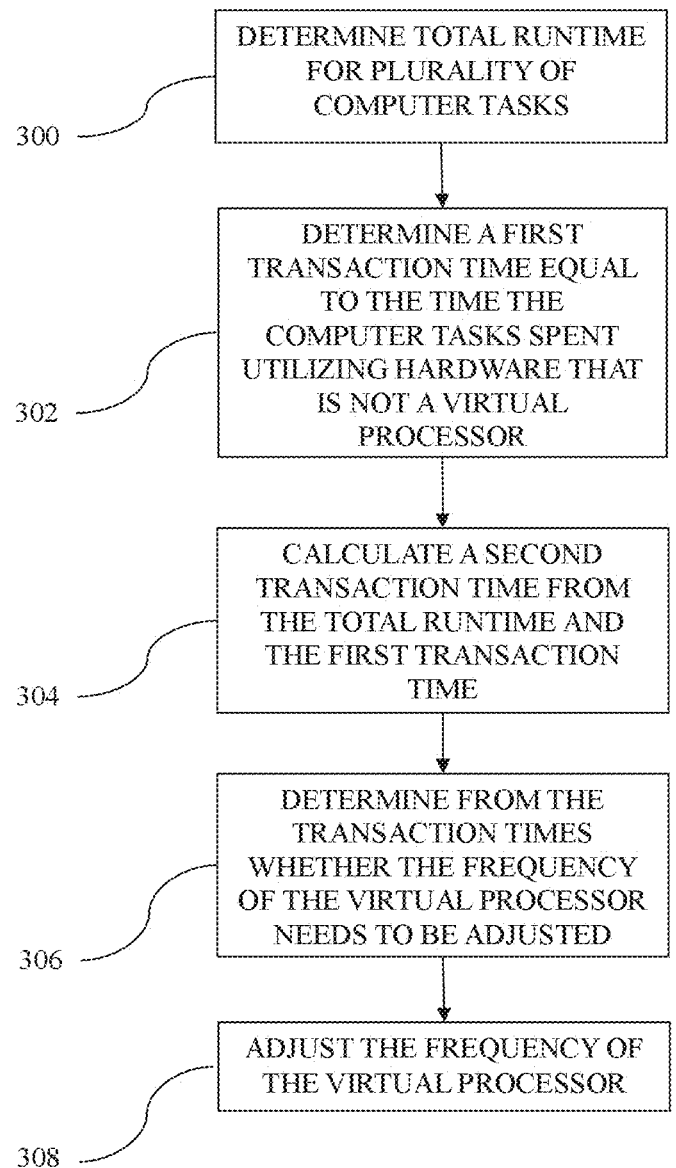
FIG. 4 is a method for dynamically altering the virtual frequency of a virtual component.

FIG. 4 is a flow chart of an example of a computer implemented method for dynamically altering a virtual component's frequency. The method is discussed in conjunction with FIG. 3 and can be performed by Task DFS. For the purposes of this discussion, it is assumed the method disclosed in FIG. 4 is altering the frequency of a virtual processor. In some embodiments, other virtual components may also have their respective frequencies altered. In this example, the alteration is a change in virtual frequency, not the actual frequency of the underlying physical processor. That is, the frequency change is processed as an input to the simulation.

At step 300, the total runtime for a plurality of application tasks is determined. In some embodiments, the runtime is the time since the virtual processor's frequency was last adjusted. In FIG. 3, a first total runtime is represented as $\Delta T_0$ and a second total runtime is represented by $\Delta T_1$. The tasks of FIG. 3 can continue to run until they are terminated, and there may therefore be $\Delta T_{n+1}$ total runtimes. Total runtimes $\Delta T_0$ and $\Delta T_1$ represent the time Task A and Task B spend in the running state. $\Delta T_1$ additionally or alternatively represents the time since Task DFS was last in a running state. In an embodiment, the total runtime is the time that Task DFS spends in a ready, blocked, or wait state. Alternatively or additionally, the total run times includes the time Task DFS spends in a running state, rather than only the times Task A and Task B are in a running state.

At step 302, a first transaction time is determined. The first transaction time can be the time that a set of processes, such as Task A and Task B, spend utilizing virtual components that are not the virtual processor. In one embodiment, the first transaction time is the amount of time spent utilizing virtual components that are designated as low frequency, such as virtual representations of flash memory 108 or LCD 107. Alternatively or additionally, the first transaction time is the time spent performing I/O operations. In some embodiments, Step 302 is performed by Task DFS while it is in a running state, such as at time slices t2-t3 and t5-t6.

At step 304, a second transaction time is calculated from the first transaction time and the total transaction time. The second transaction time is the total transaction time, minus the first transaction time. In one embodiment, the second transaction time is the time that the application tasks, such as Task A and Task B, spent utilizing the virtual processor. Alternatively or additionally, the second transaction time is the time spent utilizing any component that has a scalable frequency.

Step 306 determines from the transaction times whether it is necessary to adjust the power to the virtual processor. This determination is based on the second transaction time and the total transaction time values. For example, a ratio of the second transaction time to the total time is calculated. A high ratio would result from application tasks mostly leveraging the virtual processor because the second transaction time would be approaching the total transaction time. Conversely, a low ratio would result if the processes were mostly I/O bound, because the second transaction time would be much less than the total transaction time. The resulting ratio is then compared to the current frequency of a virtual processor to determine if the adjustment is necessary. Any other ratio involving the first transaction time, second transaction time, or total transaction time can be used.

Finally, at 308, the adjustment is made. If a ratio was calculated in step 306, the ratio can also represent the direction of the adjustment. For example, a high ratio relative to the current frequency can result in a positive adjustment because the processes are CPU intensive. Increasing the frequency may therefore increase the performance of these processes. A low ratio can result in a negative adjustment because the processes are I/O intensive. Lowering the frequency to the CPU may conserve energy while the CPU is not being used, with little or no discernable performance impact. If the ratio is substantially similar to the current level, no adjustment or a small adjustment may occur. For example, if the tasks are CPU bound, and the CPU is already operating at a high frequency, it may not be possible or beneficial to increase the frequency further.

Figure 5:
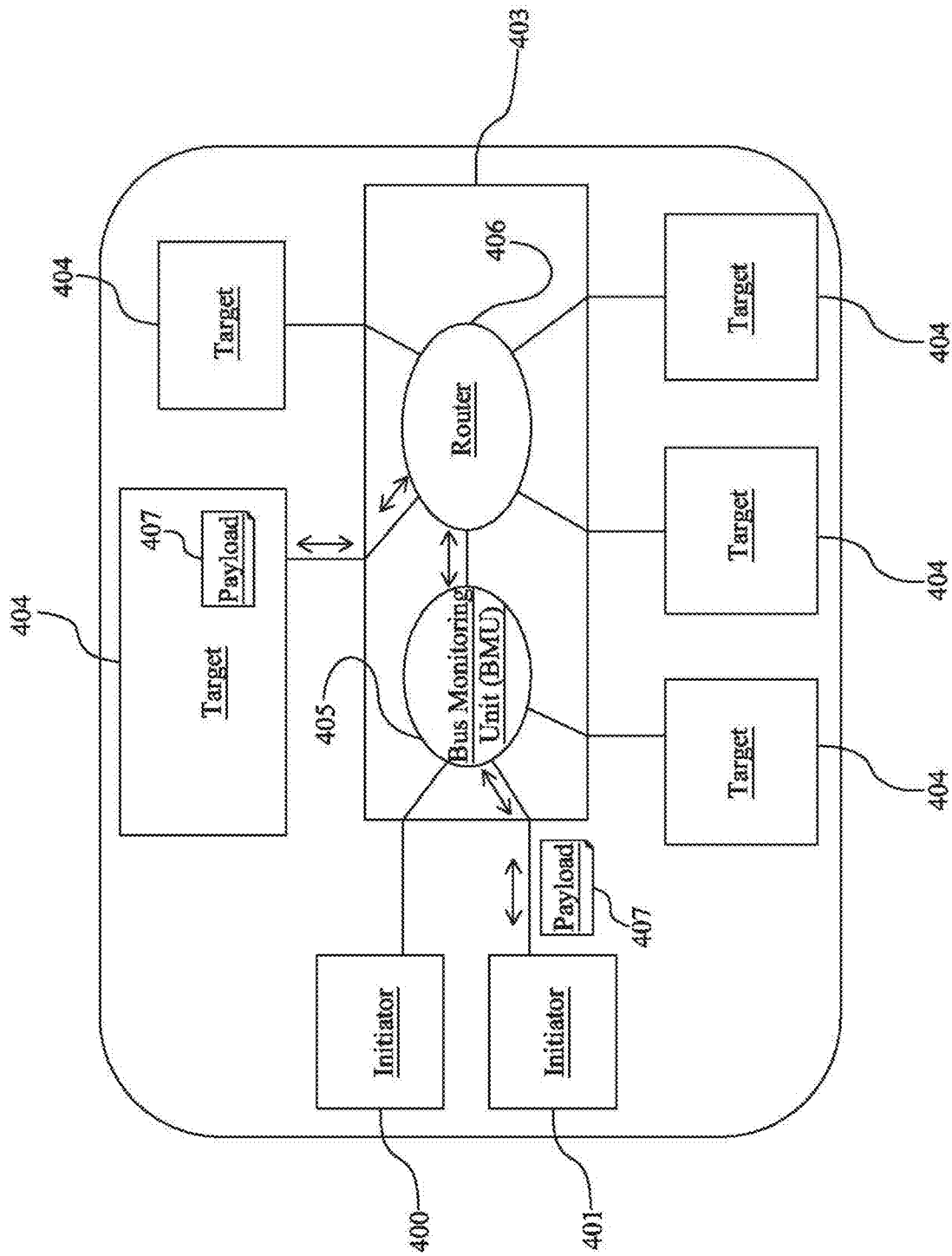
FIG. 5 is a transaction level model of a virtual platform designed to facilitate dynamic frequency adjustment of a virtual component.

FIG. 5 is a transaction level model (TLM) of the physical platform of FIG. 2 designed to facilitate the method of FIG. 4. FIG. 5 is comprised of a plurality of TLM elements corresponding to the hardware components of FIG. 1. Initiators 400 and 401 represent processor 102 and DMA 106, respectively. System bus 114 is represented by TLM bus 403. The other virtual components GFX 104, Ethernet 105, DMA 106, LCD 107, Flash 108, and RAM 109 are represented by targets 404, where each target 404 has a unique target ID. TLM bus 403 further comprises bus monitoring unit (BMU) 405 and router 406. Payload 407 represents a portion of an application task being processed by a given target in the system.

Application tasks, such as Task A and Task B, can be processed as TLM transactions controlled by initiators 400 and 401. While in a running state, portions of the application task can be placed in TLM payloads, such as payload 407. The payload can be submitted to bus 403 where it is directed by router 406 to the appropriate target for processing. After processing, the target can place the payload back on TLM bus 403 where it is returned to the initiator. All traffic from initiators 400 and 401 can be monitored by BMU 405. It should be appreciated that the payload depicted in FIG. 5 is the same payload in each representation. Movement of a payload is represented by double-headed arrows in several locations to demonstrate movement through the system. The double-headed arrows represent the payload's path from initiator 401 to a target, and back again.

BMU 405 is configured to monitor traffic on the TLM bus 403. When an initiator 400 or 401 submits a payload 407 to a target 404, the payload passes through BMU 405. Similarly, when a target returns a payload to the initiator, the payload can pass back through the BMU. The payload can contain the target ID of the target which processed it. The BMU can therefore monitor all the traffic on the bus, in addition to the traffic's source and destination.

The BMU can be used to monitor target transaction times. For example, when a payload is submitted by an initiator, the BMU can record the submission time. When the target responds with a payload, the BMU can note the response time. From these two time stamps the BMU can determine the total time a target spends processing the payload. Alternatively or additionally, a target calculates its own processing time and include it with the response payload. In such an embodiment the BMU retrieves the processing time directly from the payload without performing any further calculations.

The BMU can store the transaction time in memory in a variety of useful formats. In one embodiment, the transaction time can be associated with a target ID. Each time a target processes a new payload, a new transaction time can be stored, such that a given target may have multiple transaction times in memory. Alternatively, the BMU can keep a running total of the transaction time independent of the processing target. Each time a new payload is processed, the BMU can add the new time to the total.

In one embodiment, the BMU can store a hybrid of the individual transaction times and the running total transaction time. For example, when a given target first processes a payload, the processing time can be stored by the BMU. Each subsequent transaction time for that target can be added to the time stored by the BMU. If another target processes a payload, that second target's transaction time can be stored separately as a running total for that second target.

Figure 6:
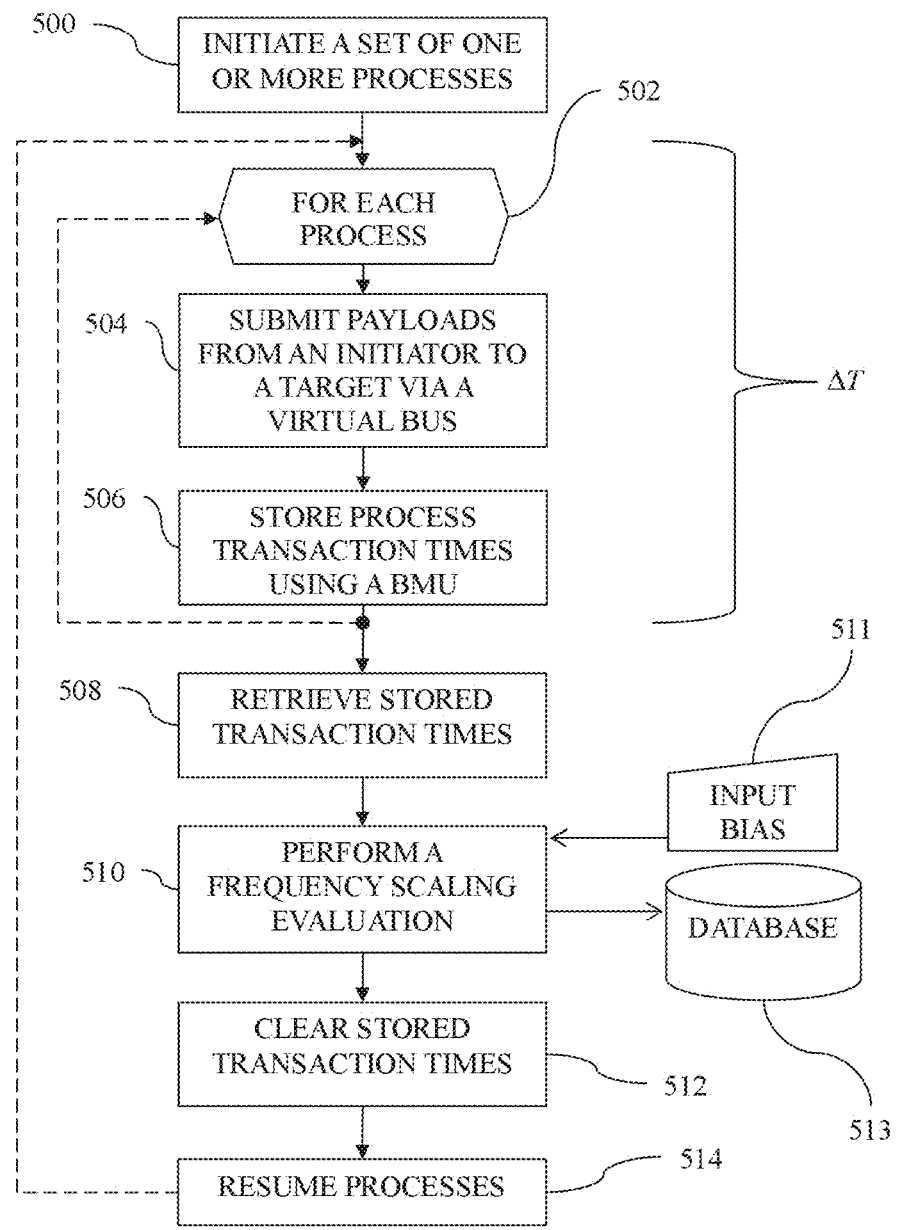
FIG. 6 is a flowchart demonstrating dynamic frequency scaling in a transaction level model.

FIG. 6 is a flowchart demonstrating DFS in a TLM model, such as that of FIG. 5, according to one embodiment of this disclosure.

At 500 a set of processes are initiated. This initiation can occur, for example, when the virtual environment is started up. In an embodiment, the processes may be Task A, Task B, and Task DFS shown in FIG. 3.

At 502, a loop is performed for each process. This loop may be context switching performed by an operating system running in the virtual environment. Prior to entering the loop, each process may be in a wait, ready, or blocked state. While inside the loop each process may be in a running state. This loop may continue until all the processes have run, or may be interrupted by the operating system or user. The frequency of this context switching can be controlled by a setting in the operating system. Alternatively or additionally, the context switching can be a user defined value.

The value ΔT is the total transaction time shown in FIG. 4. It is the total time loop 502 spends executing, and is provided for ease of reference to the earlier figures. While ΔT only encompasses steps 502-06 in FIG. 6, other embodiments include other steps.

At 504, the process is in a running state. It can submit tasks to a virtual processor, or to one or more of the TLM targets as payloads, over a virtual bus. This submission can be substantially similar to the process discussed above in reference to FIG. 5.

At 506, payload target transaction times can be stored by the BMU. This storage can occur in a similar manner as discussed in reference to FIG. 4. Alternatively, the BMU can store only the transaction times of tasks utilizing the virtual processor. In one embodiment, both the target transaction times and the virtual processor transaction time are stored by the BMU.

Following step 506, loop 502 can repeat until it is interrupted by a user or a process similar to Task DFS.

At 508, the transaction times stored by the BMU in step 506 are retrieved from memory. These transaction times can be used to determine a total target transaction time that is equal to the time the TLM targets spent processing payloads. If the retrieved transaction times are segmented by target, such that each target has a unique entry in memory, they can be added together to determine the total target transaction time. If the retrieved time is the time spent utilizing the virtual processor, the retrieved time can be subtracted from the total transaction time $\Delta T$ to determine a total target transaction time.

At 510, a frequency scaling evaluation is performed. In some embodiments, the evaluation is substantially similar to the method disclosed in FIG. 4, where the first transaction time is equal to the total target transaction time calculated in step 508. The frequency scaling evaluation can analyze the time each process spent utilizing different virtual hardware components. It can then adjust the frequency to the virtual processor accordingly. For example, if the processes spent a more time utilizing the TLM targets, the virtual processor can be set to a low frequency. Similarly, if the processes spent most of the time submitting tasks to the virtual processor, the frequency can be increased. If the processes spent some time utilizing both the virtual processor and the TLM targets, the frequency can be set to a level that balances both power consumption and performance.

By scaling the frequency of the virtual processor based on the last iteration over the processes (i.e. based on the last complete iteration of loop 502), the system is able to dynamically optimize its performance. As new processes are started or stopped, the transaction times will be impacted. For example, if a new process is started that heavily utilizes the virtual processor, the policy evaluation of step 510 will result in an increase of the processor's frequency. Similarly, if the process is stopped, the evaluation will lower the processor's frequency. This allows the system to learn new power profiles based solely on the processes running at a given time. It also allows the system to predict future power requirements based on the last process iteration. If a given set of processes have been I/O intensive on one iteration, it is likely that they will be I/O intensive on the next iteration as well.

In one embodiment, the policy evaluation results (experts) of step 510 can be stored in memory for future consideration. For example, the system can store the results of the previous ten evaluations (experts). Each evaluation (expert) can factor into the new frequency consideration, with the more recent evaluations carrying more weight. This can serve to protect against processes with short runtimes that consume a disproportionate amount of resources.

Figure 7:
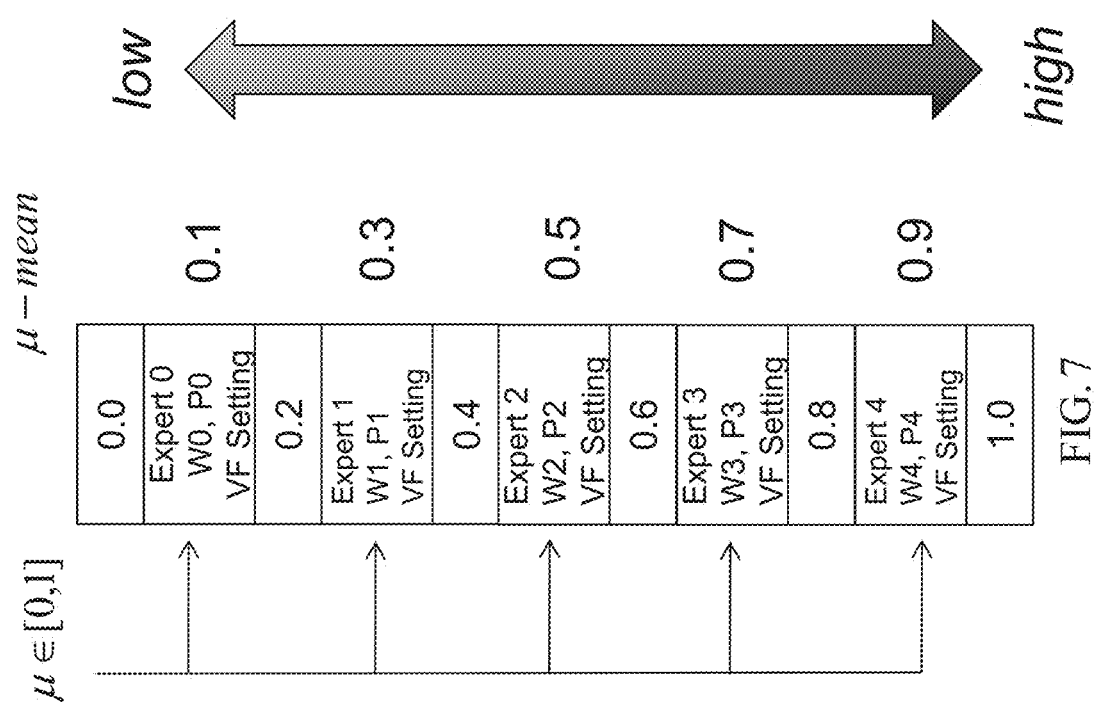
FIG. 7 illustrates an implementation policy, in accordance with some embodiments.

As shown in FIG. 7, some embodiments include a computer implemented DVFS task, which balances performance against energy loss. Given a series of clock times $T_0, T_1, T_2,$ ..., and a corresponding series of time slices between those times $(T_0\text{-}T_1, T_2\text{-}T_3, \ldots T_{N-1}\text{-}T_N)$, the total loss can be derived as follows:

$$\Delta T = T_i - T_{i-1}, \; i = 0, 1, 2, \ldots n$$

where Tio is obtained from the BMU, $$T_{cpu} = \Delta T - T_{io} \quad (1)$$

$$\mu = \frac{T_{cpu}}{\Delta T} \text{ where } 0 \le \mu_l^t \le 1$$

if $(\mu > \mu_{mean}) l_e = 0, \; l_p = \mu - \mu_{mean} l_p = \text{Performance Loss} \quad (2)$ if $(\mu < \mu_{mean}) l_e = \mu_{mean} - \mu, \; l_p = 0 \quad (3)$ $l_e = \text{Energy} \cdot \text{Loss}$ total loss $l_t = \alpha \times l_e + (1 - \alpha) \times l_p \quad (4)$ where $0 \le \alpha \le 1$, user defined energy loss/performance trade off On-line learning is used to predict target voltage-frequency (v-f) setting. Given the total loss, the system calculates the weight as:

$$w_i^{t+1} = w_i^t \times (1 - (1 - \beta) \times l_t) \text{ where } 0 \le \beta \le 1 \quad (5)$$

user defined, set to 0.75

Thus the probability is calculated by:

$$p_i^t = \frac{w^t}{\sum_{i=1}^{n} w_i^t} p_i^t = \langle p_1^t, p_2^t, p_3^t \ldots p_N^t \rangle \quad (6)$$

where $0 \le p_i^t \le 1$

The expert having the highest probability is selected to adjust processor's voltage-frequency setting.

FIG. 7 shows an example of implementation of the policy. For example, assume there are a total of 5 experts, each having a respective v-f setting, weight, and probability, as shown in FIG. 7.

In the beginning $(T_0)$, the DVFS policy task sets all experts' weights to be equal (for example, zero). The DVFS policy task then becomes dormant.

At time T0, the DVFS policy task wakes up, calculates equation (1), and uses the result to select an expert. See FIG. 7. Assume expert 3 is selected.

Once the expert is chosen, the DVFS policy task continues to calculate and update equations (2), (3), (4), (5), and (6) for expert 3. This allows determination of the final probability by equation (6) for the selected expert. The DVFS policy chooses the highest probability value among all experts, and uses it to adjust the processor Voltage-Frequency setting.

At this point (end of time slice $T_0\text{-}T_1$), the probability is only calculated for expert 3. All the other experts' probability values are zero. According the rule (by which the expert having the highest probability is selected), the DVFS policy selects the V-F setting of expert 3, and adjusts the CPU frequency.

Then the DVFS policy task becomes dormant (sleeps) again.

At end of time slice $T_1$-$T_2$, the DVFS task wakes up, and repeats the steps of calculating equation (1), updating the expert selection, and updating the execution of equations (2), (3), (4), (5), and (6) for the currently selected expert. Assume that at time $T_2$, expert 2 is chosen, and the DVFS policy task updates the probability for expert 2. Then the DVFS policy task scans all experts in FIG. 7 to find the highest probability, and use the chosen expert to adjust the processor v-f setting.

The DVFS task continues to repeat waking up, calculating equation (1), updating the expert selection, and updating the execution of equations (2), (3), (4), (5), and (6) for the currently selected expert.

In one embodiment, the results of the evaluation (expert) are written to an external database 513. The external database can be located on the physical machine 10 running the virtual environment or in another suitable machine. This database can be used for power analysis purposes. It can include information regarding the TLM targets, the time processes spent utilizing the virtual processor, the time the processes spend utilizing TLM targets, or the like. Running the power analysis at the ESL allows this database to be populated with a considerable amount of information in a short period of time. The ESL virtual platform may execute at millions of cycle per second, and may therefore yield an immense amount of runtime data. Such information may be invaluable to the engineers in their continued design and optimization of the system.

In some embodiments, the database contents include, but are not limited to:

(1) CPU Instruction execution trace (The CPU execution flow that gives the user the actual paths of program running and branching on multi-core system-on-chip, SOC);

(2) CPU interrupt events trace (Provides the interrupt types (MMU/TLB fault, system call, timer interrupts, DMA interrupts, external interrupts, etc));

(3) CPU L1/L2 Cache hit/miss trace (Monitors the cache operations);

(4) BUS transaction trace (Logging transaction-level modeling (TLM) BUS transactions (e.g.: TLM states of an initiator and target in an approximate Time style));

(5) Main Memory Read/Write transaction trace (Provides the memory R/W addresses log); and (6) I/O devices Read/Write transaction trace (Provides the addresses and name of peripheral devices when the CPU access them).

This is only one example, and in other embodiments, the database contents differ from the above list.

At 511, a user defined value can be submitted to bias the policy evaluation. For example, a user can place a lower bound on the frequency adjustment to maintain a minimum level of performance. Alternatively or additionally, the user can bound the upper level of the frequency adjustment to limit the maximum power consumption or temperature at which the processor runs. In an embodiment, the user input biases the ratio discussed in FIG. 4. For example, a user can input a value to increase the second transaction time, thereby increasing the system's performance and power consumption. Similarly, a user can input a value to decrease the second transaction time, thereby lowering performance and power consumption. The user input can also be used to impact the first transaction time or the total transaction time.

In one embodiment, the user bias can be based on data contained in the external database 513. This may be particularly beneficial while designing and optimizing the system. A set of processes may be allowed to run for a number of iterations or a designated amount of time to populate the database. Engineers can then observe the recorded trends, modify the ESL design, and/or submit a bias. The processes can then be run again to observe the effect of the changes. Allowing user bias input can allow substantially instantaneous modification to the system, which in turn may decrease design times.

At 512, the transaction times stored by the BMU are cleared from memory so they do not impact the next process iteration. Alternatively, the transaction times can be left in memory indefinitely or for a lessor period of time.

Finally, at 514 the processes waiting for Task DFS to complete are resumed and the method repeats itself. Execution of this method can continue until the virtual platform is shut down or until all the processes are terminated. In should be appreciated that the method is not limited to the processes initiated in step 500, and new application processes can be started or stopped at any time.

In some embodiments, a computer has a processor programmed to execute processes comprising: a processing unit simulator; at least one hardware component simulator; a system bus simulator in communication with the processing unit simulator and the at least one hardware component simulator; and a bus monitoring unit (BMU) configured to monitor traffic between the processing unit simulator and the at least one hardware component simulator. The BMU is further configured to record bus usage data in a non-transient computer readable storage medium. The bus usage data includes a transaction time representing how long the at least one hardware component simulator takes to process a task In some embodiments, a method, comprises: determining a total runtime for a plurality of application tasks running on a computer simulator; determining a first transaction time based on the time the application tasks spend utilizing at least one hardware component simulator that is not a processing unit simulator; calculating a second transaction time from the total runtime and the first transaction time; determining from the second transaction time, the first transaction time, and the total transaction time whether a frequency of the processing unit simulator is to be adjusted; and adjusting the frequency to the processing unit simulator.

In some embodiments, a non-transient machine readable storage medium is encoded with program code, wherein when the program code is executed by a processor, the processor performs a method comprising the steps of: establishing a computer simulator configured to simulate a hardware environment, wherein the computer simulator is comprised of at least one high frequency hardware component simulator and at least one low frequency hardware component simulator; running at least one computer task on the computer simulator; and adjusting a simulated power level associated with a high frequency hardware component simulator based on the time the low frequency hardware component simulator spends processing the computer task.

The methods and system described herein can be at least partially embodied in the form of computer-implemented processes and apparatus for practicing those processes. The disclosed methods can also be at least partially embodied in the form of tangible, non-transient machine readable storage media encoded with computer program code. The media can include, for example, RAMs, ROMs, CD-ROMs, DVD-ROMs, BD-ROMs, hard disk drives, flash memories, or any other non-transient machine-readable storage medium, wherein, when the computer program code is loaded into and executed by a computer, the computer becomes an apparatus for practicing the method. The methods can also be at least partially embodied in the form of a computer into which computer program code is loaded and/or executed, such that, when the computer program code is loaded into and executed by a computer, the computer becomes an apparatus for practicing the methods. When implemented on a general-purpose processor, the computer program code segments configure the processor to create specific logic circuits. The methods can alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. A method, comprising:
    determining a total runtime for a plurality of application tasks running on a computer simulator;
    determining a first transaction time based on the time the application tasks spend utilizing at least one hardware component simulator, wherein the first transaction time represents time spent performing input/output operations;
    calculating a second transaction time from the total runtime and the first transaction time, wherein the second transaction time represents time spent utilizing at least one component having a scalable frequency;
    determining from the second transaction time and the total runtime whether a frequency of the processing unit simulator is to be adjusted; and
    adjusting the frequency to the processing unit simulator, wherein the frequency is adjusted based on a ratio between the second transaction time and the total transaction time.

2. The method of claim 1, wherein determining the first transaction time further comprises the steps of:
    monitoring a system bus simulator for a first payload transferred from an initiator to a target device;
    receiving a second payload from the target device, wherein the second payload contains a third transaction time representing a time the target device spent processing the first payload;
    storing the third transaction time in a memory; and
    calculating the first transaction time from the third transaction time stored in the memory.

3. The method of claim 1, wherein determining the first transaction time further comprises the steps of:
    monitoring a system bus simulator for a first payload transferred from an initiator and a target device;
    recording the time the first payload was transferred in memory;
    receiving a second payload from the target device;
    calculating a difference between the submitted time of the first payload and a received time of the second payload; and
    storing the difference in memory as the first transaction time.

4. The method of claim 1, wherein the ratio is biased by a user defined value.

5. The method of claim 1, wherein the frequency is increased if the ratio is higher than a predetermined value.

6. The method of claim 1, wherein the frequency is lowered if the ratio lower than a predetermined value.

7. A non-transient machine readable storage medium encoded with program code, wherein when the program code is executed by a processor, the processor performs a method comprising the steps of:
    establishing a computer simulator configured to simulate a hardware environment, wherein the computer simulator is comprised of at least one first frequency hardware component simulator and at least one second frequency hardware component simulator, wherein the at least one first frequency hardware component comprises a scalable frequency and the at least one second frequency hardware component comprises an input/output component;
    running at least one computer task on the computer simulator; and
    adjusting a frequency of the computer simulator based on a first time spent by the at least one first frequency hardware component to perform the at least one computer task and a second time spent by the at least one second frequency hardware component to perform the at least one computer task, wherein the frequency is increased when the first time is greater than the second time and the frequency is decreased with the first time is less than the second time.

8. The non-transient machine readable storage medium of claim 7, wherein the at least one first frequency hardware component simulator is an Instruction Set Simulator (ISS) configured to simulate a hardware processor.

9. The non-transient machine readable storage medium of claim 7, wherein the computer simulator is an Electronic System Level (ESL) design of the hardware environment.

10. The non-transient machine readable storage medium of claim 9, wherein the ESL design is embodied in a transaction level model (TLM).

11. The non-transient machine readable storage medium of claim 10, wherein the system bus simulator is a TLM bus configured to transport a payload from a TLM initiator to a TLM target.

12. The non-transient machine readable storage medium of claim 9, wherein the ESL design of the hardware system is a design of a system on a chip (SoC).

13. The non-transient machine readable storage medium of claim 7, wherein the first frequency hardware component simulator is an Instruction Set Simulator (ISS) configured to simulate a hardware processor.

14. The non-transient machine readable storage medium of claim 7, wherein the method performed by the processor further comprises:
    writing the bus usage data to a database stored on the non-transient machine readable storage medium.

15. A method, comprising:
    establishing a computer simulator configured to simulate a hardware environment, wherein the computer simulator is comprised of at least one processing unit simulator and at least one hardware component simulator, wherein the at least one hardware component simulator comprises an input/output component;
    running a first plurality of tasks on the computer simulator, wherein the first plurality of tasks include at least one low frequency task and at least one high frequency task, wherein each low frequency task corresponds to time spent performing input/output operations and each high frequency task corresponds to time spent utilizing a component having a scalable frequency; and
    adjusting a frequency of the processing unit simulator based on a first time spent performing the at least one low frequency task and a second time spent performing the at least one high frequency task, wherein the frequency is increased when the first time is less than the second time and the frequency is decreased with the first time is greater than the second time, wherein the simulated hardware environment comprises a bus monitoring unit (BMU) configured to monitor traffic between the at least one processing unit simulator and the at least one hardware component simulator, wherein the BMU is further configured to record bus usage data in a non-transient computer readable storage medium, wherein the bus usage data includes the total transaction time.

16. The method of claim 15, comprising:
running a second plurality of tasks in the hardware environment; and
further adjusting the frequency of the processing unit simulator based on a ratio of high frequency transaction time or low frequency transaction time of the second plurality of tasks to the transaction time for one of the at least one high frequency task or the at least one low frequency task of the first plurality of tasks.

17. The method of claim 15, wherein the at least one processing unit simulator is an Instruction Set Simulator (ISS) configured to simulate a hardware processor.

18. The method of claim 15, wherein the computer simulator is an Electronic System Level (ESL) design of the hardware environment.

19. The method of claim 18, wherein the ESL design is embodied in a transaction level model (TLM).

20. The method of claim 19, wherein the ESL design of the hardware system is a design of a system on a chip (SoC).

* * * * *